United States Patent [19]

Gross

[11] Patent Number: 4,493,818

[45] Date of Patent: Jan. 15, 1985

[54] PHOSGENE REMOVAL PROCESS

[75] Inventor: James R. Gross, Lake Jackson, Tex.

[73] Assignee: The Dow Chemical Company, Midland, Mich.

[21] Appl. No.: 574,315

[22] Filed: Jan. 27, 1984

Related U.S. Application Data

[63] Continuation-in-part of Ser. No. 440,104, Nov. 8, 1982, abandoned.

[51] Int. Cl.$^3$ .............................................. B01D 53/34
[52] U.S. Cl. ................................... 423/240; 423/424; 423/499
[58] Field of Search ............... 423/210, 240, 241, 424, 423/499

[56] References Cited

U.S. PATENT DOCUMENTS

| | | | |
|---|---|---|---|
| 2,430,861 | 11/1947 | Carpenter et al. | 423/210 |
| 3,314,753 | 4/1967 | Richert et al. | 423/240 X |
| 3,376,113 | 4/1968 | Frevel et al. | 423/240 |
| 3,411,867 | 11/1968 | Beech et al. | 423/240 |
| 3,789,580 | 2/1974 | Allemang et al. | 423/240 |
| 4,064,218 | 12/1977 | Scholz et al. | 423/240 |
| 4,301,126 | 11/1981 | Duembgen et al. | 423/240 |

*Primary Examiner*—Earl C. Thomas
*Attorney, Agent, or Firm*—B. G. Colley

[57] ABSTRACT

Phosgene is removed from an off gas containing phosgene by contacting the off gas with an aqueous solution containing alkali metal hydroxide and a tertiary amine compound having 3 to 20 carbon atoms. The concentration of the alkali metal hydroxide can vary from 1 to 25 weight percent and the concentration of the tertiary amine can be any amount which is effective in the contact apparatus chosen. The amines found to be useful are trialkyl amines having 1 to 4 carbon atoms and pyridines having 0 to 3 alkyl groups of 1 to 5 carbon atoms and diamines such as 4-dimethylaminepyridine.

10 Claims, No Drawings

4,493,818

PHOSGENE REMOVAL PROCESS

CROSS-REFERENCE TO RELATED APPLICATIONS

This application is a continuation-in-part of application Ser. No. 440,104 filed Nov. 8, 1982, and now abandoned.

BACKGROUND OF THE INVENTION

This invention relates to a process of removing phosgene from off gases by contacting the off gases with aqueous alkali metal hydroxide solutions containing tertiary amines.

It is known from U.S. Pat. No. 2,430,861 that hexamethylenetetramine can neutralize phosgene in a phenolic oil solution.

It is known from U.S. Pat. Nos. 3,376,113; 3,411,867 and 3,789,580 that phosgene can be removed from gases by using activated alumina.

It is also known from U.S. Pat. Nos. 3,314,753 and 4,301,126 that phosgene can be removed from gases by using activated carbon.

The use of aqueous caustic solutions containing ammonia to remove phosgene from off gases is taught by U.S. Pat. No. 4,064,218.

The present invention is superior to the known prior art in that the use of beds of activated alumina or carbon with their need for regeneration is eliminated. The known use of caustic-ammonia scrubbing is much less efficient than the present invention.

SUMMARY OF THE INVENTION

It now has been found that phosgene can be removed from off gases more efficiently than the known prior art by contacting or scrubbing the off gases with an aqueous solution comprising 1 to 25 weight percent of an alkali metal hydroxide and an amount effective to remove phosgene of a tertiary amine compound having 3–20 carbon atoms.

Preferrably the tertiary amines used are trialkylamines having 1 to 4 carbon atoms in the alkyl moiety or pyridines having 0 to 3 alkyl groups of 1 to 5 carbon atoms. However, ditertiary amine compounds such as 4-dimethylaminopyridine are also useful.

It appears that the use of the above tertiary amines is more efficient because they form a quaternary ammonium salt complex with the phosgene which appears to catalyze the reaction between phosgene and the alkali metal hydroxide. The advantage of this invention is that since it has a high capacity for phosgene, a capital equipment savings can be made in that smaller scrubbing towers or contactors can be used.

DESCRIPTION OF THE PREFERRED EMBODIMENTS

The alkali metal hydroxide used herein can be potassium or sodium hydroxide. Sodium hydroxide is preferred because it is more economical.

The amount of the alkali metal hydroxide used herein can vary from 1 to 25 weight percent and preferably 5 to 10 weight percent. Amounts less than 1 percent are not very effective and amounts greater than 25 are not desired because the produced salts (carbonates and chlorides) tend to precipitate from solution.

Useful trialkylamines for this invention are trimethylamine, triethylamine, tri-n-propylamine and tri-n-butylamine as well as the mixed amines such as methyl diethylamine, dimethylethylamine, methyldipropylamine, propyldimethylamine and the like.

Useful pyridines for this invention include pyridine, 2, 3, or 4 picoline, 2, 3 -; 2, 4 -; 2, 5 -; 2, 6 -; 3, 4 -; and 3,5 - lutidine, 2, 3 or 4 ethyl pyridine, 2, 3 or 4 isopropyl pyridine, 3, 4-diethyl pyridine, 3, 5-diethyl pyridine, 3 ethyl-4-methylpyridine, 2, 4, 6-trimethyl pyridine and the like.

Other tertiary amines that are useful herein are ditertiary amine compounds such as pyrazine, 2,5-dimethylpyrazine, pyridazine, 4-dimethylaminopyridine, and the like.

The foregoing tertiary amines can be used in effective amounts from about 0.02 to about 20 weight percent and preferably 0.2 to 10.0 weight percent. Amounts less than about 0.02 percent are relatively ineffective and amounts greater than 20 percent needlessly limit the capacity of a scrubber by displacing caustic solution.

For each tertiary amine the lower effective amount and the preferred amount can be established by routine experimentation with the particular dispersing equipment used. With pyridine, it falls between 0.067% and 0.34% by weight of the aqueous hydroxide solution. With triethylamine, the lowest effective amount is less than 0.024%. However, it is to be understood that these limits are based on the simple scrubber system set forth in control A. With a more dynamic system as achieved in countercurrent flow contact with a static mixer, one would expect the limits could be still lower. For practical operation, an amount slightly above the lowest effective level would be chosen from experimentation.

The temperature at which the phosgene is reacted with the aqueous solution is not critical and can be in the range from 5° to 95° C. It is preferred to use ambient temperatures.

While the use of a conventional packed column or a static mixer with the flow of phosgene contaminated gases counter current to the flow of the aqueous solution of this invention might be advantageous to give better dispersing efficiency, it is possible to use this invention by merely diffusing the phosgene laden feed stream into a tank containing the aqueous solution.

The rate of flow of the off gas feed stream is not critical. The upper limit depends on the dispersing efficiency and heat removal efficiency of the scrubber system.

The following examples are presented to further illustrate but not limit the invention.

Control A (Caustic only)

A 250 ml gas washing bottle was used in which the gas enters the bottle through a central vertical tube, the lower end of which is equipped with a fritted disk or cylinder and is below the surface of the wash liquid. The bottle was vented to the atmosphere by a side arm located near the top of the bottle. The bottle was charged with 227.5 g of 12.3% aqueous sodium hydroxide solution. Phosgene was introduced at the rate of 2.5 g./min. Phosgene-sensitive tape held over the vent detected phosgene after only 0.5 g phosgene gas was fed. The bottle was equipped with a magnetic stirrer to insure good gas/liquid contact.

Control B (Caustic with 0.067% pyridine)

The gas washing bottle of Control A was charged with 295 g of 5% aqueous NaOH and 0.2 g pyridine to give a solution containing 0.067% pyridine. Phosgene was detected at the vent before a measurable amount had been fed into the central tube.

Control C (Caustic with 0.339% ammonia)

The apparatus of Control A was charged with 295 g of 5% aqueous NaOH and 1.0 g $NH_3$ (3.4 g of aqueous ammonia 29.4%). Phosgene was introduced at the rate of 2.5 g/min. and there was an immediate detection of phosgene by the phosgene indicator tape. Even at a reduced flow at a rate of 0.5 g/min., phosgene just bubbled up through the stirred caustic. In 2 minutes a total of 1.0 g phosgene was fed to the scrubber with blow by the entire time.

Control D (Caustic with 0.678% ammonia)

The procedure of Control C was repeated with another 1.0 g of $NH_3$ being added to the scrubber. Phosgene blow by was detected after 1.0 g was fed in 1.5 minutes.

Control E (Caustic with ethylene diamine)

The procedure of Control C was repeated with 1.0 g ethylene diamine in 295 g of 5% aqueous sodium hydroxide. 3 g of phosgene was consumed in 1.5 minutes without blow by. The phosgene rate was reduced to 0.66 grams per minute and phosgene was detected at the outlet after only 1.0 g additional phosgene.

Example 1 (Caustic with 0.439% pyridine)

Anhydrous pyridine (freshly distilled) (1.0 g) was added to the wash bottle of Control A and seven grams of phosgene was fed to the scrubber without any phosgene detected at the vent.

Example 2 (Caustic with 0.339% pyridine)

The scrubber system of Control B is charged with 0.9 g of additional pyridine for a total of 1.1 g pyridine and after 2 minutes of phosgenation at 2.5 g/min. no phosgene was detected at the vent.

Example 3 (Caustic with 10.2% pyridine)

The apparatus of Control A was charged with 54 g 50% NaOH, 156.5 g $H_2O$, and 24 g pyridine and operated as before. The pyridine actually formed a dispersed phase in the caustic and turned bright purple as soon as phosgene was introduced. No phosgene was detected at the vent after 5.0 grams had been fed.

Example 4 (Caustic with 4.5% pyridine)

Example 3 was repeated with 54.16 g 50% aqueous NaOH, 158.17 g water, and 10.16 g pyridine with the same results.

Example 5 (Caustic with 0.339% triethylamine)

The system of Control A was charged with 1.0 gram of triethylamine and 295 grams of 5% aqueous sodium hydroxide. Phosgene was then introduced at a rate of 2.5 grams/minute until a total of eight grams was added. There was no detection of phosgene at the side outlet.

Example 6

A glass column (15 cm diameter by 51 cm) having a sieve plate was half filled with small beryl saddles on the plate. The column was charged with 4000 ml of 10% aqueous sodium hydroxide containing 1% pyridine. The column also had a small recycle pump (100 ml per minute) to pump the solution over the beryl saddles. The column was vented to the atmosphere at the top and had a phosgene inlet at the bottom below the sieve plate.

A 1000 ml flask was filled with 5% aqueous sodium hydroxide and 110 g of phosgene was bubbled through the solution in 100 minutes with the off gas going into the above glass column scrubber. No phosgene was detected at the scrubber vent. The scrubber solution became yellow colored due to the formation of a pyridinephosgene complex and the color dissipated after several hours of circulation without more phosgene.

Example 7

The procedure of Example 6 was repeated with 220 g of phosgene. The scrubber solution became quite hot (70°-80° C.) but no phosgene was detected at the vent.

Example 8 (Caustic with 0.024% triethylamine)

The apparatus of Control A was charged with 300 g. of 6.3% NaOH and 7.2 mg of triethylamine and operated as before. No phosgene was detected at the vent until between 7 and 8 grams of phosgene had been fed at a rate of from 1.0 to 2.0 grams per minute.

I claim:

1. A process for removing phosgene from an off gas containing phosgene which comprises contacting said off gas with an aqueous solution comprising 1 to 25 weight percent of an alkali metal hydroxide and an amount effective to remove phosgene of a tertiary amine compound having 3–20 carbon atoms.

2. The process as set forth in claim 1 wherein the amount of said alkali metal hydroxide is 5 to 10 weight percent and the amount of said tertiary amine is 0.02 to 20.0 weight percent.

3. The process as set forth in claim 1 wherein the alkali metal hydroxide is sodium hydroxide.

4. The process as set forth in claim 1 wherein the tertiary amine is pyridine.

5. The process as set forth in claims 1, 2 or 3 wherein the tertiary amine is triethylamine.

6. A process for removing phosgene from an off gas containing phosgene which comprises contacting said off gas with an aqueous solution comprising 1 to 25 weight percent of an alkali metal hydroxide and 0.2 to 10 weight percent of a tertiary amine selected from the group consisting of trialkylamines having 1 to 4 carbon atoms in the alkyl moiety and pyridines having 0 to 3 alkyl groups of 1 to 5 carbon atoms.

7. The process as set forth in claim 6 wherein the amount of said alkali metal hydroxide is 5 to 10 weight percent and the amount of said tertiary amine is 0.02 to 20.0 weight percent.

8. The process as set forth in claim 6 wherein the alkali metal hydroxide is sodium hydroxide.

9. The process as set forth in claim 6 wherein the tertiary amine is pyridine.

10. The process as set forth in claims 6, 7 or 8 wherein the tertiary amine is triethylamine.

* * * * *